United States Patent [19]

Lech, Jr.

[11] Patent Number: 4,556,136
[45] Date of Patent: Dec. 3, 1985

[54] CLUTCH DRIVEN PLATE ASSEMBLY

[75] Inventor: Thaddeus Lech, Jr., Farmington Hills, Mich.

[73] Assignee: Borg-Warner Corporation, Chicago, Ill.

[21] Appl. No.: 556,517

[22] Filed: Nov. 30, 1983

[51] Int. Cl.[4] .............................................. F16D 3/14
[52] U.S. Cl. ........................... 192/106.2; 192/70.17; 192/106.1
[58] Field of Search ............... 192/106.1, 106.2, 70.17; 464/62, 64, 68

[56] References Cited

U.S. PATENT DOCUMENTS

| | | | |
|---|---|---|---|
| 2,276,416 | 3/1942 | Nutt | 192/68 |
| 3,066,780 | 12/1962 | Blau | 192/70.16 |
| 3,181,673 | 5/1965 | Poliseo | 192/103 |
| 3,299,671 | 1/1967 | DeCastelet | 464/68 |
| 3,362,194 | 1/1968 | Bertelson et al. | 192/106.2 |
| 3,428,155 | 2/1969 | Binder et al. | 464/68 |
| 3,534,841 | 10/1970 | Schneider et al. | 464/68 |
| 3,556,273 | 1/1971 | Maucher | 192/106.2 |
| 3,809,198 | 5/1974 | Mori | 192/106.2 |
| 4,101,015 | 7/1978 | Radke | 192/106.2 |
| 4,270,645 | 6/1981 | Beccaris | 192/106.1 |
| 4,360,352 | 11/1982 | Lamarche | 192/106.2 |
| 4,418,812 | 12/1983 | Lech, Jr. | 192/106.2 |
| 4,446,955 | 5/1984 | Lech, Jr. | 192/106.2 |
| 4,461,376 | 7/1984 | Lech, Jr. et al. | 464/68 |
| 4,471,863 | 9/1984 | Lech, Jr. | 192/106.2 |
| 4,484,898 | 11/1984 | Kohno | 192/106.2 |
| 4,485,909 | 12/1984 | Gatewood | 464/64 |
| 4,494,642 | 1/1985 | Hashimoto | 192/70.17 |

FOREIGN PATENT DOCUMENTS

| | | | |
|---|---|---|---|
| 1285339 | 12/1968 | Fed. Rep. of Germany | 192/106.1 |
| 968623 | 9/1964 | United Kingdom | 192/106.1 |

Primary Examiner—Henry C. Yuen
Attorney, Agent, or Firm—James A. Geppert

[57] ABSTRACT

A clutch driven plate assembly for use in an automotive vehicle adapted to dissipate the irregular impulses of the vehicle engine when the transmission is in neutral, the clutch is engaged and the engine is at idle rpm. The assembly includes a clutch plate, a spring retainer plate secured to the clutch plate, and a hub in operative engagement with the transmission input shaft and having an integral hub flange with spring windows opened to allow an additional rotational travel of the clutch and spring retainer plates relative to the hub. An axially movable cam member has a splined opening receiving the splined transmission shaft and projections with 45° camming surfaces, a ramp member with cooperating camming surfaces and notches in its periphery encompassing the damper springs located in the plate windows and cam springs positioned in aligned recesses in the cam member and hub to align the splines of the cam member and hub and bias the parts axially apart.

7 Claims, 17 Drawing Figures

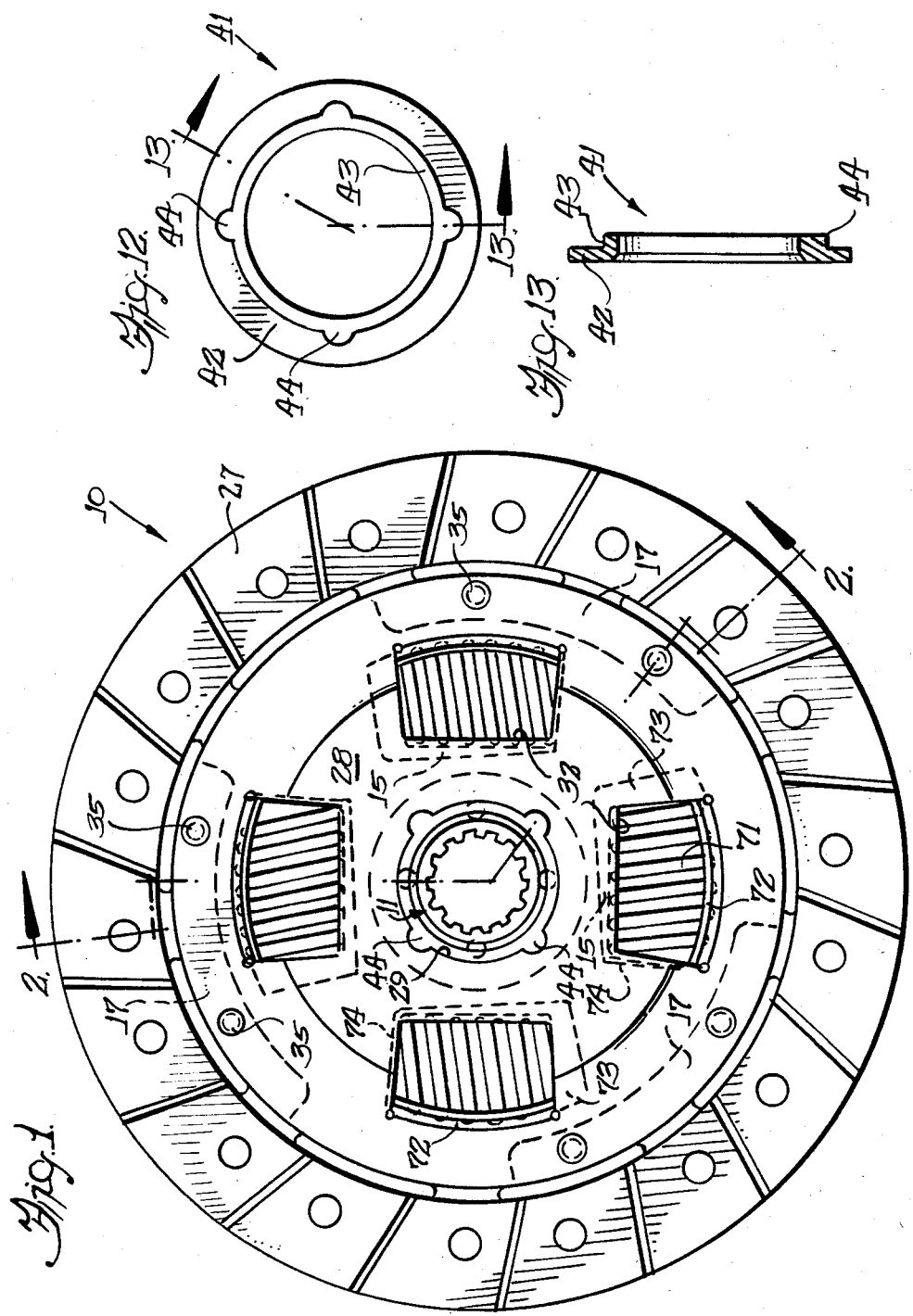

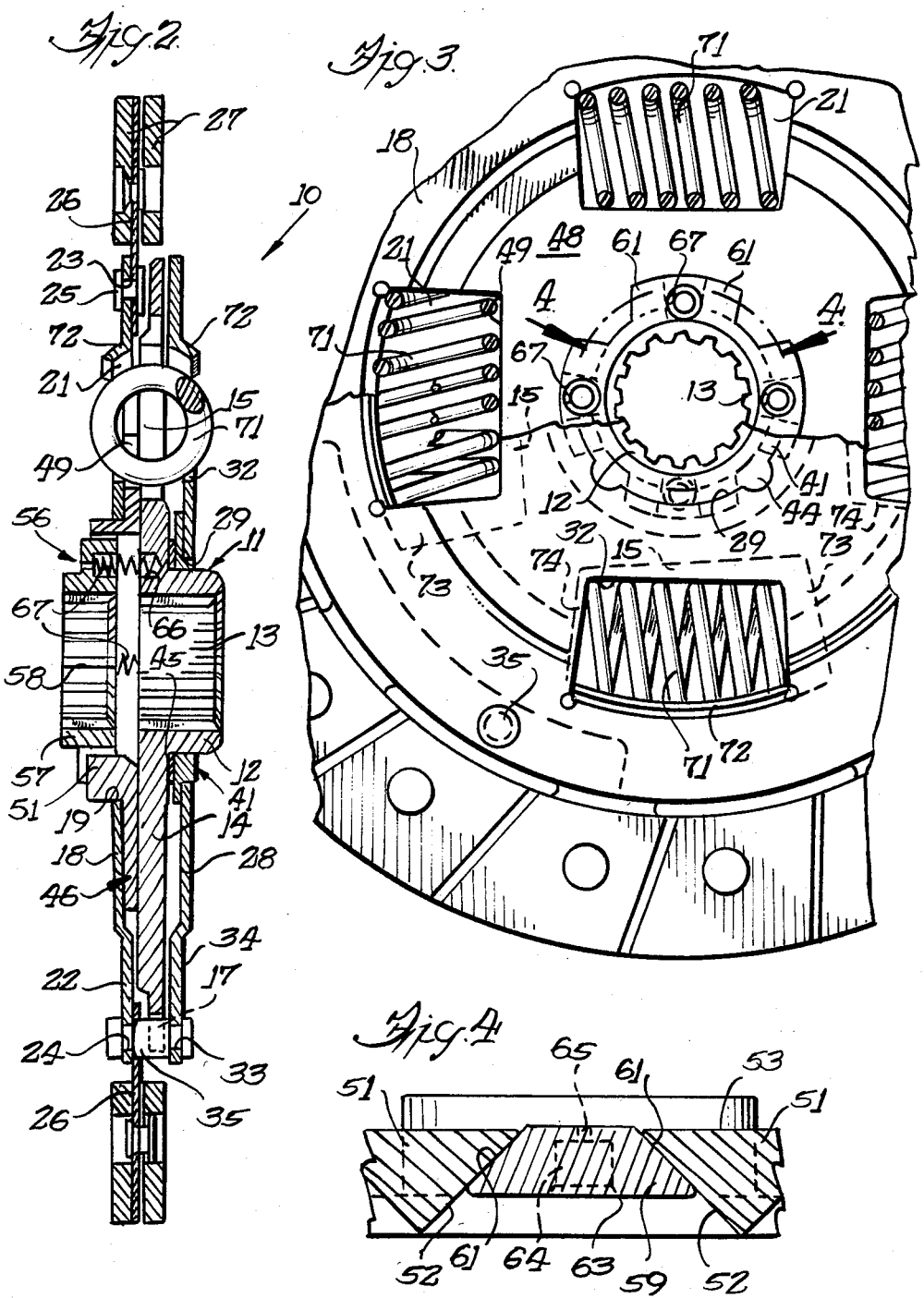

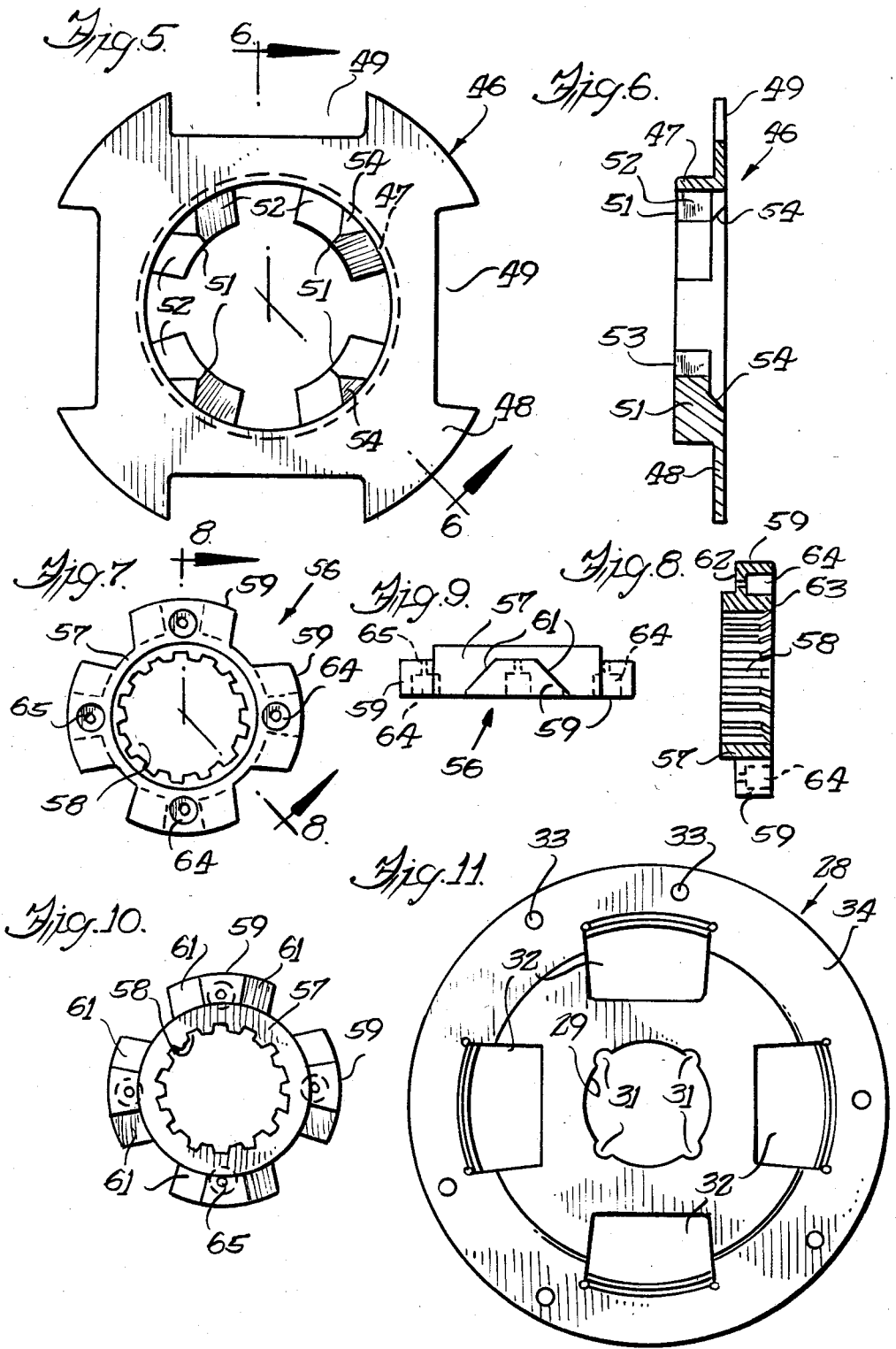

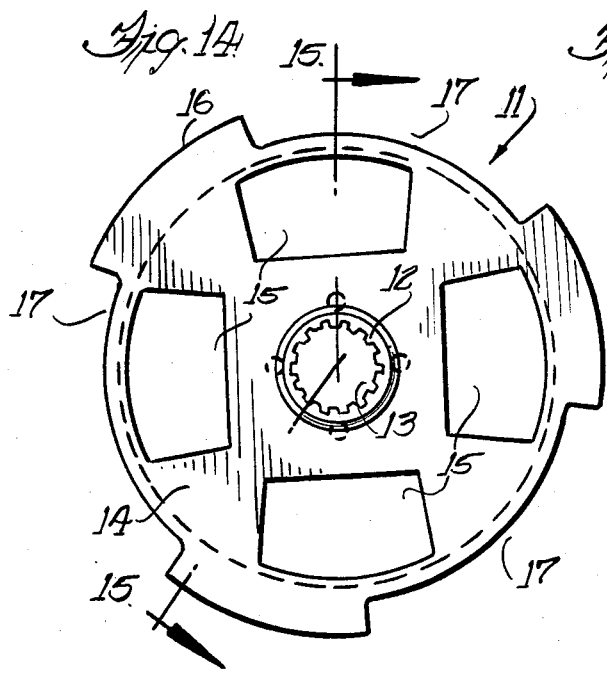
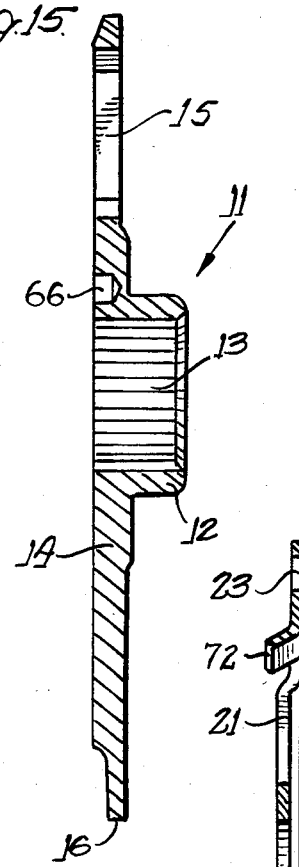
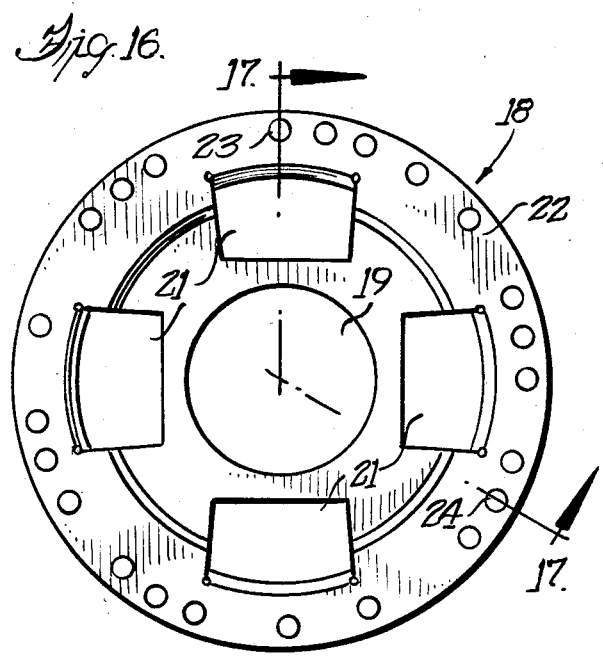
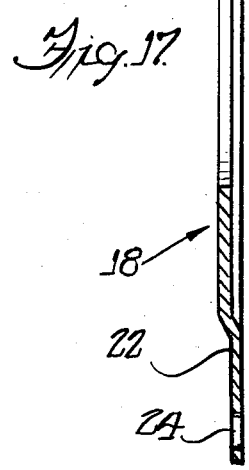

CLUTCH DRIVEN PLATE ASSEMBLY

BACKGROUND OF THE INVENTION

In a conventional friction clutch for a manual transmission in an automotive vehicle, the engine has power and inertia impulses which drive the engaged clutch with an irregular series of thrusts when the transmission is in neutral and the engine is at idle rpm. These impulses will be transmitted to the transmission gears which become excited, resulting in oscillation through their backlash space to produce objectionable rattle. In my copending application Ser. No. 212,925, now U.S. Pat. No. 4,446,955, I disclose a driven plate assembly utilizing a helical connection between an inner hub and an outer hub to allow relative axial movement between the hubs to dissipate the engine impulses. The present invention relates to another approach to this problem to simplify construction of the clutch assembly.

SUMMARY OF THE INVENTION

The present invention comprehends the provision of a clutch driven plate assembly having a novel hub and cam arrangement to dissipate engine impulses which had previously resulted in objectionable transmission gear rattle with the clutch engaged, the transmission in neutral and the engine at idle rpm. The hub arrangement includes a hub barrel in operative engagement with the transmission input shaft and an integral radial flange with enlarged spring windows relative to the spring windows formed in the clutch and spring retainer plates; the clutch plate carrying the clutch friction facings at its periphery. A ramp member rotatable with the clutch plate has 45° camming surfaces on the surface opposite the hub, a cam member has cooperating camming surfaces and a splined opening receiving the transmission input shaft, and resilient means act between the cam member and the hub. The interengaging camming surfaces provide for axial movement of the cam member relative to the ramp member and hub against the force of the resilient means.

The present invention also comprehends the provision of a clutch driven plate assembly having a novel assembly including a hub having an integral flange with enlarged spring windows for both the drive and coast directions relative to the windows in the clutch and spring retainer plates, and a cam member in splined engagement with the transmission input shaft and a ramp member rotatable with the plates. The ramp member and cam member have complementary interengaging camming surfaces so that relative rotation results in axial movement of the cam during idling. Compression springs are interposed between the cam member and the hub to yieldably resist movement of the cam towards the hub, with the springs being 90° out of plane with the normal damper springs.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a rear elevational view of the clutch driven plate assembly embodying the present invention.

FIG. 2 is a cross sectional view of the assembly taken on the irregular line 2—2 of FIG. 1.

FIG. 3 is a partial rear elevational view of the clutch driven plate assembly with the spring retainer plate and hub broken away.

FIG. 4 is an enlarged partial cross sectional view of the cam and ramp assembly taken on the irregular line 4—4 of FIG. 3.

FIG. 5 is an enlarged rear elevational view of the ramp member of FIGS. 1 and 2.

FIG. 6 is a cross sectional view taken on the irregular line 6—6 of FIG. 5.

FIG. 7 is a rear elevational view of the cam member of FIGS. 1 and 2.

FIG. 8 is a cross sectional view taken on the irregular line 8—8 of FIG. 7.

FIG. 9 is a top plan view of the cam member.

FIG. 10 is a front elevational view of the cam member.

FIG. 11 is a rear elevational view of the spring retainer plate.

FIG. 12 is a rear elevational view of a bushing keyed to the spring retainer plate.

FIG. 13 is a cross sectional view taken on the irregular line 13—13 of FIG. 12.

FIG. 14 is a rear elevational view of the hub for the assembly.

FIG. 15 is a cross sectional view taken on the irregular line 15—15 of FIG. 14.

FIG. 16 is a front elevational view of the clutch driven plate.

FIG. 17 is an enlarged cross sectional view taken on the irregular line 17—17 of FIG. 16.

DESCRIPTION OF THE PREFERRED EMBODIMENT

Referring more particularly to the disclosure in the drawings wherein is shown an illustrative embodiment of the present invention, FIGS. 1 through 3 disclose a clutch driven plate assembly 10 including a hub 11, a clutch plate 18 carrying friction facings 27 mounted on the periphery thereof and adapted to be positioned between friction surfaces of a flywheel and a pressure plate (not shown) for the vehicle clutch, and a spring retainer plate 28. The hub member 11 (FIGS. 14 and 15) includes a barrel 12 with a splined central opening 13 receiving the splined end of a transmission input shaft (not shown) and an integral radial flange 14 having a plurality of circumferentially equally spaced arcuate spring windows 15 and terminating in a periphery 16 with three circumferentially equally spaced elongated notches 17.

The clutch driven plate 18 (FIGS. 16 and 17) has a central opening 19, a plurality of circumferentially equally spaced spring windows 21, and an inwardly offset outer periphery 22 containing a plurality of openings 23 and 24 arranged in a circle; the openings 23 receiving rivets 25 to secure cushioning plates 26 carrying the opposed friction facings 27 for the clutch.

The spring retainer plate 28 (FIGS. 2 and 11) has a central opening 29 with four circumferentially equally spaced notches 31 therein, a plurality of circumferentially equally spaced arcuate spring windows 32 axially aligned with the windows 15 and 21 of the hub and clutch plate, respectively, and a plurality of openings 33 in the inwardly offset periphery 34 axially aligned with openings 24 to receive spacer rivets 35 to secure the clutch plate 18 and spring retainer plate 28 together; the rivets extending through the elongated notches 17 in the hub flange periphery.

Positioned on the hub barrel 12 is a spacer ring or bearing 41 (FIGS. 12 and 13) having a radial flange 42 integral with an axial sleeve 43. Four axially extending ribs 44 are formed integral with the sleeve to be received in the notches 31 in spring retainer plate 28, so that the hub is piloted concentric in the assembly by the bushing. The bushing or spacer may be formed of a suitable plastic material and, as seen in FIG. 2, a friction washer 45 may be located between the hub flange 14 and bushing flange 42 if additional frictional lag force is desired.

A ramp member 46 is positioned on the opposite side of the hub flange between the driven plate 18 and flange. The ramp member (FIGS. 4, 5 and 6) includes a generally cylindrical sleeve or barrel 47 with an integral radial flange 48 having four circumferentially equally spaced peripheral notches 49 which are of a length equal to and adapted to be axially aligned with the spring windows in the plates 18 and 28. Formed in the sleeve or barrel 47 of the ramp member are four circumferentially equally spaced radially inwardly extending projections 51, each having a pair of oppositely disposed 45° inclined ramp surfaces 52, 52 converging from the front surface 53 of the member to terminate short of the flange in an outwardly inclined end surface 54.

Located generally concentrically within the ramp member 46 is an axially reciprocable cam member 56 (FIGS. 7 through 10) including a cylindrical body or barrel 57 with a central splined opening 58 also receiving the splined end of the transmission input shaft. Extending radially outwardly from the barrel 57 are four circumferentially equally spaced projections 59 having oppositely disposed 45° inclined ramps or camming surfaces 61,61 with the projections being complementarily received between the projections 51 on the ramp member 46; the ramp surfaces 61,61 converging toward the front 62 of the cam member. In the rear surface 63 of each cam projection 59 is a spring recess 64 terminating in a small opening 65 extending through the projection.

Also, four spring recesses 66 are formed in the hub 11 facing and axially aligned with the recesses 64 to receive the ends of compression springs 67. These springs serve the dual function of normally biasing the hub and cam member apart, limited by the coacting projections 51, 59, and of aligning the splines in the central openings 13 and 58 of the hub barrel 12 and cam barrel 57, respectively.

One or more concentric damper springs 71 are located in each aligned set of spring windows 21, 15 and 32 in the plates and hub flange, with the plate windows 21 and 32 having inclined outer lips 72 to retain the springs in operative position. As seen in FIGS. 1 and 3, the spring windows 15 in the hub flange are enlarged relative to the clutch and spring retainer plate windows in the drive direction at 73 and by a smaller amount in the coast direction at 74. The function of the enlarged windows will become more apparent when considering operation of the assembly. Also, the springs 67 and 90° out of plane with the normal damper springs 71 to break up harmonic influence and resonance by changing the plane of motion.

In the normal position of the hub with the clutch disengaged, as seen in FIG. 1, the bushing 41 is keyed to the spring retainer plate 28 and the damper springs 71 are positioned in the notches 49 of the ramp member 46 in an uncompressed state. Also, the springs 67 urge the cam member 56 forwardly away from the hub 11 with the ramps 52,52 and 61,61 being fully engaged as seen in FIG. 4. This clutch assembly operates in the same manner as a conventional assembly except for the action of the ramp member 46 and cam member 56 at idle rpm and in neutral transmission position. With the clutch engaged between the flywheel and pressure plate, the engine impulses during idle act to rotate the clutch plate 18, spring retainer plate 28 and damper springs 71 relative to the hub due to the enlarged portion 73 of the spring windows 15, which springs in turn rotate the ramp member 46 to urge the cam member 56 axially rearwardly on the transmission input shaft against the force of the compression springs 67 due to the interaction of the ramp surfaces 52,61. Movement continues until the damper springs strike the ends of the enlarged portion of the hub flange spring windows. The energy of the impulses is used to actuate the cam member in the above manner rather than transmit the undiminished impulses to the vehicle transmission to cause its gears to rattle.

In the normal driving mode of the vehicle, the hub 11 rests against the damper springs 71 to compress them upon torque application to the friction facings, which loosens the ramp member 46 so that it no longer drives the cam member 56. This action reduces wear on the ramp surfaces 52,61 by allowing them not to operate during the normal driving mode when their action is not required. The rest of the assembly operates in a conventional manner.

I claim:

1. A clutch driven plate assembly for an automotive vehicle clutch driving a transmission input shaft, including a hub having a barrel splined onto the input shaft and a radial flange, a clutch plate carrying friction facings at the outer periphery thereof, a spring retainer plate secured to the clutch plate to sandwich said hub flange therebetween, said plates and hub flange having axially aligned sets of circumferentially spaced windows therein, and damper springs received in each set of windows, the improvement comprising a ramp member journalled within said clutch plate and having a radial flange with peripheral notches receiving said damper springs therein, a series of camming surfaces on said ramp member, a cam member splined onto said transmission input shaft and having complementary camming surfaces engaging the camming surfaces on said ramp member, said interengaging camming surfaces causing axial movement of said cam member upon rotation of said ramp member, said hub flange spring windows extending circumferentially beyond said plate spring windows to allow limited rotation of said plates relative to said hub without compression of said damper springs, rotation of said plates and damper springs causing rotation of said ramp member resulting in axial movement of said cam member.

2. A clutch driven plate assembly as set forth in claim 1, wherein said cam member has circumferentially spaced recesses facing said hub and said hub has recesses axially aligned with said cam member recesses, and a compression spring received in each aligned pair of facing recesses to bias the cam member away from the hub.

3. A clutch driven plate assembly as set forth in claim 1, including an annular spacer positioned between said hub and spring retainer plate, said retainer plate having spaced notches accommodating ribs formed on said spacer.

4. A clutch driven plate assembly for an automotive vehicle clutch driving a transmission input shaft, including a hub having a barrel splined onto the input shaft and a radial flange, a clutch plate carrying friction facings at the outer periphery thereof, a spring retainer plate secured to the clutch plate to samdwich the hub flange therebetween, said plates and hub flange having axially aligned sets of circumferentially spaced windows therein, and damper springs received in each set of windows, the improvement comprising a ramp member journalled within said clutch plate and having a radial flange with peripheral notches receiving said damper springs therein, a cam member splined onto said transmission input shaft, said ramp member having a plurality of inner projections with camming surfaces thereon, said cam member having a plurality of outer projections with complementary camming surfaces thereon engaging the camming surfaces on said ramp member, said hub flange spring windows extending circumferentially beyond said plate spring windows to allow limited rotation of said plates, damper springs and ramp member relative to said hub without compression of said damper springs, said cam member having circumferentially spaced recesses facing said hub and said hub having recesses axially aligned with said cam member recesses, and a compression spring received in each aligned pair of facing recesses to bias the cam member away from the hub, said interengaging camming surfaces causing axial movement of said cam member upon rotation of said ramp member.

5. A clutch driven plate assembly as set forth in claim 4, in which said camming surfaces are 45° inclined surfaces.

6. A clutch driven plate assembly as set forth in claim 5, in which said notches of the ramp member closely encompass the damper springs in their uncompressed state.

7. A clutch driven plate assembly as set forth in claim 4, in which said hub flange windows are enlarged for approximately 8° travel in the drive direction and approximately 1° travel in the coast direction.

* * * * *